US008419253B2

(12) United States Patent
Burrak

(10) Patent No.: US 8,419,253 B2
(45) Date of Patent: Apr. 16, 2013

(54) LIGHTING DISPLAY SYSTEM

(75) Inventor: Alexander Burrak, Schwabach (DE)

(73) Assignee: Mass & Ross AG, Hilpoltstein (DE)

(*) Notice: Subject to any disclaimer, the term of this patent is extended or adjusted under 35 U.S.C. 154(b) by 51 days.

(21) Appl. No.: 12/595,666

(22) PCT Filed: Apr. 14, 2008

(86) PCT No.: PCT/EP2008/002953
§ 371 (c)(1), (2), (4) Date: Oct. 13, 2009

(87) PCT Pub. No.: WO2008/125325
PCT Pub. Date: Oct. 23, 2008

(65) Prior Publication Data

US 2010/0110688 A1 May 6, 2010

(30) Foreign Application Priority Data

Apr. 13, 2007 (DE) ......................... 10 2007 017 934

(51) Int. Cl.
*B64D 47/06* (2006.01)

(52) U.S. Cl.
USPC ........... 362/559; 362/551; 362/555; 362/560; 40/551; 40/552; 40/545; 40/576

(58) Field of Classification Search .................. 362/559; 40/551, 552, 545, 576
See application file for complete search history.

(56) References Cited

U.S. PATENT DOCUMENTS 2,059,451 A 11/1936 Green
3,221,432 A * 12/1965 Gold ............................... 40/551
3,404,475 A * 10/1968 Coad ............................... 40/552
3,553,870 A * 1/1971 Rudolph ......................... 40/576
3,722,120 A * 3/1973 Finkel ............................. 40/618
3,755,943 A * 9/1973 Cesarotti ......................... 40/552
3,780,430 A * 12/1973 Feeney ............................ 29/833
(Continued)

FOREIGN PATENT DOCUMENTS

CH 480742 A 10/1969
DE 667427 A 10/1938
(Continued)

OTHER PUBLICATIONS

German Search Report Issued in Application No. 10 2007 017 934.2, Dated Jul. 24, 2007 (4 Pages).

(Continued)

*Primary Examiner* — Jong-Suk (James) Lee
*Assistant Examiner* — Bryon T Gyllstrom
(74) *Attorney, Agent, or Firm* — Osha Liang LLP

(57) ABSTRACT

A lighting display system having an anti-theft feature has a mounting structure having at least one mounting plate having a front side and a back side, first and second conductor lines carried by the at least one mounting plate, and a plurality of luminescent bodies, wherein each of the plurality of luminescent bodies has first and second contact plugs exposed at a back side of the luminescent body and connected to the first and second conductor lines where a line extending between centres of the first and second contact plugs is oriented at an angle of more than 105° or less than 85° relative to a direction of extension of the first conductor line, and a plurality of light sources electrically connected to the first and second conductor lines via the first and second plugs and fixing members.

20 Claims, 2 Drawing Sheets

U.S. PATENT DOCUMENTS

| | | | | | |
|---|---|---|---|---|---|
| 4,028,828 | A | * | 6/1977 | Chao et al. | 40/552 |
| 4,327,511 | A | * | 5/1982 | Rodriquez | 40/544 |
| 5,463,229 | A | * | 10/1995 | Takase et al. | 257/59 |
| 5,697,175 | A | * | 12/1997 | Schwartz | 40/552 |
| 6,108,955 | A | * | 8/2000 | Folsom et al. | 40/618 |
| 6,443,593 | B1 | | 9/2002 | Lauschner | |
| 7,012,196 | B2 | * | 3/2006 | Swetland | 174/254 |
| 2006/0119026 | A1 | * | 6/2006 | Ryaboy et al. | 267/140.15 |
| 2006/0266895 | A1 | * | 11/2006 | Arnone | 248/163.1 |

FOREIGN PATENT DOCUMENTS

| | | | |
|---|---|---|---|
| DE | 29914456 | U1 | 12/1999 |
| EP | 1 758 069 | A2 | 2/2007 |
| FR | 770.715 | A | 9/1934 |

OTHER PUBLICATIONS

International Search Report from PCT/EP2008/002953 dated Oct. 2, 2008 (3 pages).

Written Opinion from PCT/EP2008/002953 dated Oct. 2, 2008 (6 pages).

* cited by examiner

LIGHTING DISPLAY SYSTEM

BACKGROUND OF THE INVENTION

1. Field of the Invention

The present invention relates to a lighting display system comprising a mounting structure and a plurality of luminescent bodies fixed to the mounting structure. The lighting display system may have an advertising function or a function to convey a message.

2. Brief Discussion of Relevant Art

A conventional lighting system, providing high flexibility in that luminescent bodies representing characters can be mounted to a mounting structure via connector plugs, is known from U.S. Pat. No. 2,059,451. While this known system has high flexibility for the proprietor to change the message represented by the system, unauthorized persons can easily remove luminescent bodies and use those removed luminescent bodies for their own lighting display systems.

SUMMARY OF THE INVENTION

One or more embodiments of the present invention provides a lighting display system having an anti-theft feature.

According to one or more embodiments of the present invention, a lighting display system comprises: a mounting structure including at least one mounting plate having a front side and a back side; a first conductor line carried by the at least one mounting plate; a second conductor line carried by the at least one mounting plate and spaced apart from and extending parallel to the first conductor line; a plurality of first holes traversing the at least one mounting plate adjacent to the first conductor line; a plurality of second holes traversing the at least one mounting plate adjacent to the second conductor line; and a power supply terminal electrically connected to the first and second conductor lines which can be connected to a power supply; a plurality of luminescent bodies, each including: a first contact plug exposed at a back side of the luminescent body and connected to the first conductor line by a first fixing member being in threaded engagement with the first contact plug; a second contact plug exposed at a back side of the luminescent body and connected to the second conductor line by a second fixing member being in threaded engagement with the second contact plug; wherein a mathematical line extending between centres of the first and second contact plugs is oriented at an angle of more than 105° or less than 85°, relative to a direction of extension of the first conductor line; and a plurality of light sources electrically connected to the first and second conductor lines via the first and second plugs and bolts.

According to one or more embodiments of the present invention, the mounting structure and the plurality of luminescent bodies form a unit, wherein the luminescent bodies are fixed to the mounting structure from a back side of the mounting plate which is not easily accessible if the mounting structure is fixed to a support, such as a wall. Therefore, it is difficult for unauthorized persons to remove a luminous body from the mounting structure. Further, if unauthorized persons were successful in removing one or more luminescent bodies from the mounting structure, they would be faced with a subsequent problem that the removed luminescent bodies or letters will probably not fit to the mounting structure which they might own, since the contact plugs of the luminescent bodies and corresponding holes in the mounting plate are arranged in an irregular manner. In particular, mathematical lines connecting pairs of the first and second plugs are oriented relative to the direction of extension of the first and second conductor lines at angles which significantly deviate from 90°. For example, a group of luminescent bodies fixed to the mounting structure may have their first and second contact plugs arranged such that each pair of luminescent bodies of this group has a different angle between the line extending between its first and second plugs and the direction of extension of the first conductor line. Such luminescent bodies may comprise three, four or five or ten or more bodies.

The forgoing, and other features and advantages of the invention, will be more apparent from the following detailed description of preferred embodiments of the invention with reference to the accompanying drawings.

DETAILED DESCRIPTION

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
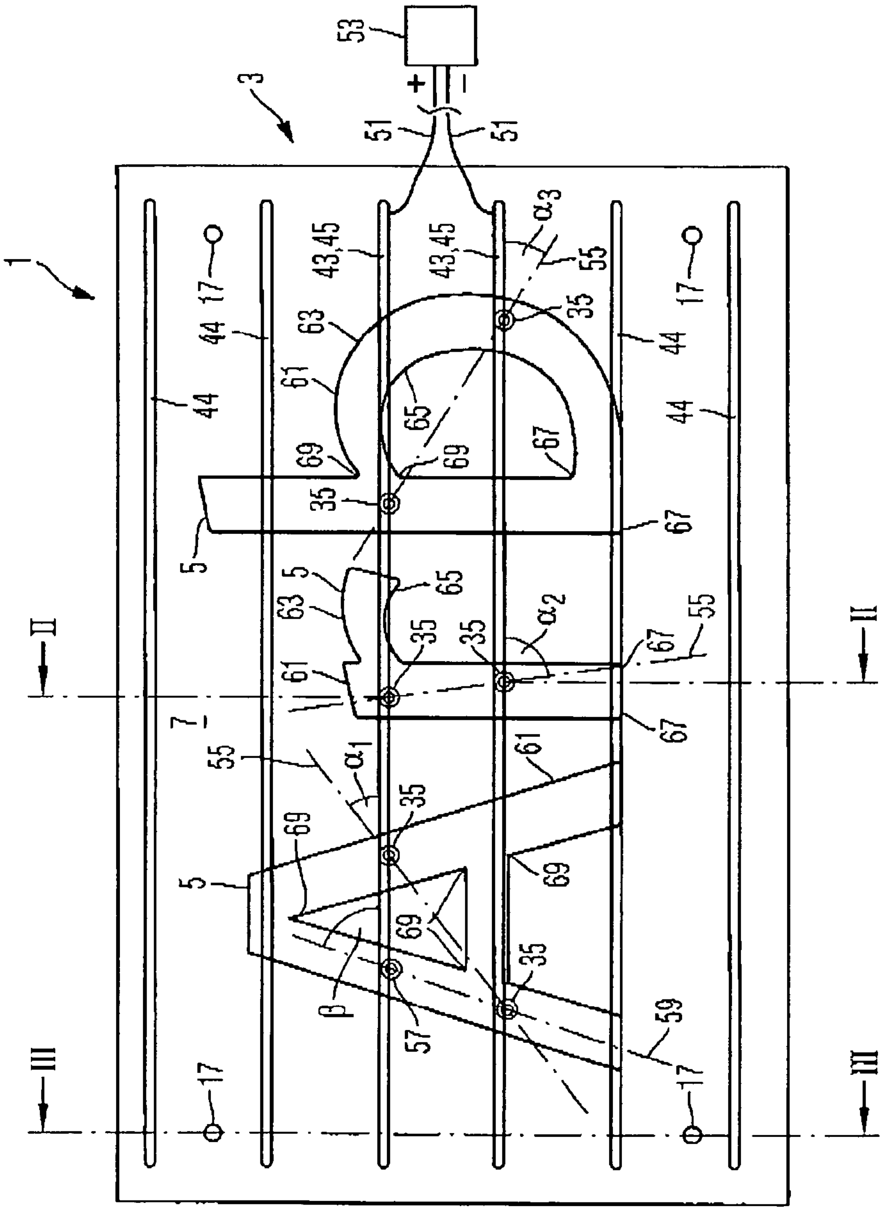
FIG. 1 shows an elevational view of a lighting display system according to one or more embodiments of the present invention.
Figure 2:
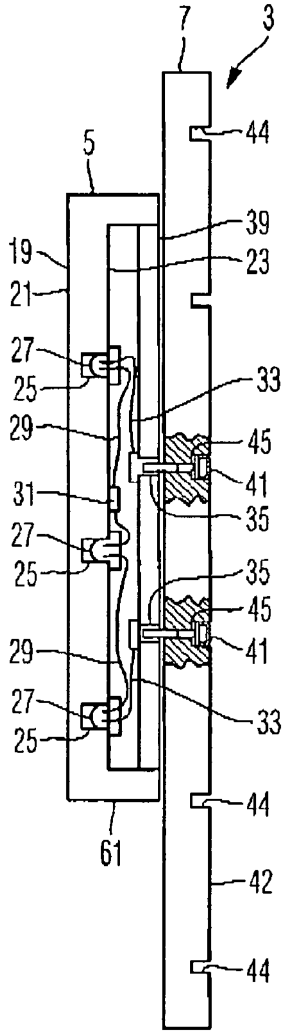
FIG. 2 is a sectional view along a line II-II of the lighting display system shown in FIG. 1.
Figure 3:
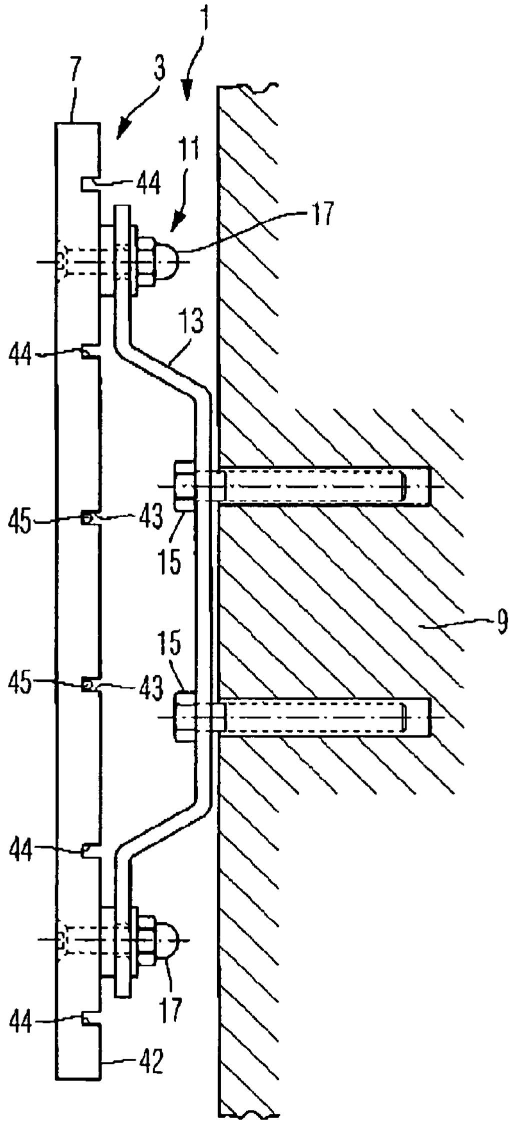
FIG. 3 is a sectional view along a line of the lighting display system shown in FIG. 1.

Reference is made to FIGS. 1 to 3 below.

A lighting system display 1 comprises a mounting structure 3 and a plurality of luminescent bodies 5. The mounting structure comprises a mounting plate 7, fixed to a mounting wall 9 by a spacer 11, which comprises a bent plate 13 which is fixed to the wall 9 by threaded bolts 15 and which is fixed to the plate 7 by bolt/nut assemblies 17.

The luminescent bodies 5, which have the shapes of letters, are each made of a translucent body 19, such as acrylic glass, having a light emitting front surface 21 and a back surface 23 oriented towards the mounting plate 7. The luminescent body 5 comprises a plurality of light sources, such as light emitting diodes 27, received in blind holes 25 formed in the back surface 23 of the translucent body 19.

Terminals 29 of the light sources 27 are connected to each other and to a resistor 31 in series, such that the light sources 27 can be operated by supplying a voltage to terminal ends 33 of the circuit formed by the light sources 27 and resistor 31.

FIG. 1 shows such a circuit comprising three light sources and one resistor 31. The luminescent bodies 5 may comprise additional light sources connected in series to, or in parallel to, such circuits.

The terminal ends 33 are each connected to a contact plug 35 inserted in and fixed to a back plate 39 of the luminescent body 5, wherein the back plate 39 is fixed to the translucent body 21 by an adhesive. The contact plugs 35 are exposed at the back plate 39 and have an internal thread, such that they engage with threaded bolts 41 traversing holes formed in the mounting plate 7 from a back side 42 thereof. These holes are located directly adjacent to grooves 43 which are formed in the back side 42 of the mounting plate 7. Current conductor lines 45 are provided in the grooves 43, and the holes receiving the bolts 41 are located directly adjacent to the conductor lines 45, such that the bolts 41 engaging the contact plugs 35 are also in electrical contact with the conductor lines 45.

The conductor lines 45 are electrically connected to power supply terminals 51, which can be connected to a power supply for operating the light sources 27 in the luminescent bodies 5.

The holes and contact plugs 35 of each luminescent body 5 are arranged such that a line 5, connecting the two holes and contact plugs 35, respectively, is oriented relative to a direction of extension of the conductor lines 43 at an angle a, which substantially deviates from 90°. In the example shown in FIG. 1, α1 is 38°, α2 is 80°, and α3 is 34°.

Each of the luminescent bodies 55 may comprise an additional plug 57 for fixing the luminescent body 5 to the mounting plate 7, wherein a line 59 extending between a plug 33 and plug 57 is oriented relative to the conductor lines 53 at an angle β which also deviates significantly from 90°. The mounting plate 7 may comprise additional grooves 44 which are not related to the electrical connection of the light sources 27.

The luminescent bodies 5 are structured such that their shapes correspond to letters. For this purpose, side surfaces 61 of the luminescent bodies 5 may comprise convex sections 63, concave sections 65, and pairs of sections of the side surfaces 61 oriented relative to each others, such that they form angles of about 90°, as indicated with reference numeral 67, and angles significantly different from 90° as indicated with reference numeral 69.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A lighting display system having an anti-theft feature, the system comprising:
- a mounting structure comprising:
  - at least one mounting plate having a front side and a back side;
  - a first conductor line carried by the at least one mounting plate;
  - a second conductor line carried by the at least one mounting plate and spaced apart and electrically insulated from and extending parallel to the first conductor line;
  - a plurality of first holes traversing the at least one mounting plate adjacent to the first conductor line, wherein the holes are arranged such that non-uniform separation exists between the holes;
  - a plurality of second holes traversing the at least one mounting plate adjacent to the second conductor line, wherein the holes are arranged such that non-uniform separation exits between the holes; and
  - a power supply terminal electrically connected to the first and second conductor lines and which is connectable to a power supply; and
- a plurality of luminescent bodies, wherein each of the plurality of luminescent bodies comprises:
  - a first contact plug exposed at a back side of the luminescent body and electrically connected to the first conductor line;
  - a second contact plug exposed at a back side of the luminescent body and electrically connected to the second conductor line, wherein a line extending between centers of the first and second contact plugs is oriented at an angle α of more than 105° or less than 85° relative to a direction of extension of the first conductor line; and
  - a plurality of light sources electrically connected to the first and second conductor lines via the first and second plugs, such that the light sources are energized when the first and second conductor lines are connected to the power supply; and
- wherein a line extending between centers of any of the first or second holes is never perpendicular to a direction of extension of the first conductor line.

2. The lighting display system according to claim 1, wherein at least one of the plurality of luminescent bodies comprises at least one third contact plug connected to one of the first and second conductor lines by a third fixing member being in threaded engagement with the third contact plug.

3. The lighting display system according to claim 2, wherein a line extending between centers of the first and third contact plugs is oriented at an angle β of more than 105° or less than 85° relative to a direction of extension of the first conductor line.

4. The lighting display system according to claim 3, wherein the at least one mounting plate is made of a transparent material.

5. The lighting display system according to claim 4, wherein the mounting structure comprises a plurality of third holes and bolts for fixing the mounting structure to a support.

6. The lighting display system according to claim 3, wherein the mounting structure comprises a plurality of third holes and bolts for fixing the mounting structure to a support.

7. The lighting display system according to claim 6, wherein the mounting structure comprises a first spacer to ensure that the at least one mounting plate is arranged at a distance from the support to which the mounting structure is fixed with the third bolts.

8. The lighting display system according to claim 2, wherein the at least one mounting plate is made of a transparent material.

9. The lighting display system according to claim 8, wherein the mounting structure comprises a plurality of third holes and bolts for fixing the mounting structure to a support.

10. The lighting display system according to claim 9, wherein the mounting structure comprises a first spacer to ensure that the at least one mounting plate is arranged at a distance from the support to which the mounting structure is fixed with the third bolts.

11. The lighting display system according to claim 2, wherein the mounting structure comprises a plurality of third holes and bolts for fixing the mounting structure to a support.

12. The lighting display system according to claim 11, wherein the mounting structure comprises a first spacer to ensure that the at least one mounting plate is arranged at a distance from the support to which the mounting structure is fixed with the third bolts.

13. The lighting display system according to claim 1, wherein the at least one mounting plate is made of a transparent material.

14. The lighting display system according to claim 13, wherein the mounting structure comprises a plurality of third holes and bolts for fixing the mounting structure to a support.

15. The lighting display system according to claim 14, wherein the mounting structure comprises a first spacer to ensure that the at least one mounting plate is arranged at a distance from the support to which the mounting structure is fixed with the third bolts.

16. The lighting display system according to claim 1, wherein the mounting structure comprises a plurality of third holes and bolts for fixing the mounting structure to a support.

17. The lighting display system according to claim 16, wherein the mounting structure comprises a first spacer to ensure that the at least one mounting plate is arranged at a distance from the support to which the mounting structure is fixed with the third bolts.

18. The lighting display system according to claim 17, wherein the distance between the at least one mounting plate and the support to which the mounting structure is fixed with the third bolts is greater than 4 mm.

19. The lighting display system according to claim 1, wherein a side surface of the luminescent body comprises a convex or a concave sections or has more than four pairs of sections intersecting at an angle of 90° or has plural pairs of sections intersecting under an angle different from an angle within a range of 85° to 95°.

20. The lighting display system according to claim 1, wherein the luminescent body has a shape corresponding to a shape of one of letters A, B, C, D, E, F, G, H, I, J, K, L, M, N, O, P, Q, R, S, T, U, V, W, X, Y and Z.

* * * * *

UNITED STATES PATENT AND TRADEMARK OFFICE

CERTIFICATE OF CORRECTION

PATENT NO. : 8,419,253 B2
APPLICATION NO. : 12/595666
DATED : April 16, 2013
INVENTOR(S) : Alexander Burrak It is certified that error appears in the above-identified patent and that said Letters Patent is hereby corrected as shown below:

On the Title page, Item (73) Assignee, “Mass & Ross AG” should be --Maas & Roos AG--.

In the Specification:

In column 2, line 34, delete “system display” and insert --display system--, therefor.

In column 3, line 8, delete “angle a” and insert --angle α--, therefor.

In the Claims:

In column 4, lines 5-6, in Claim 1, after “first and second” insert --contact--.

In column 5, lines 14-15, in Claim 19, delete “comprises a convex or a concave sections” and insert --comprises convex or concave sections--, therefor.

Signed and Sealed this
Tenth Day of December, 2013

Margaret A. Focarino
*Commissioner for Patents of the United States Patent and Trademark Office*